(12) United States Patent
Linge et al.

(10) Patent No.: US 11,625,504 B2
(45) Date of Patent: Apr. 11, 2023

(54) FAULT DETECTION

(71) Applicant: STMICROELECTRONICS (ROUSSET) SAS, Rousset (FR)

(72) Inventors: Yanis Linge, Fuveau (FR); Simon Landry, Aix-en-Provence (FR)

(73) Assignee: STMICROELECTRONICS (ROUSSET) SAS, Rousset (FR)

( * ) Notice: Subject to any disclaimer, the term of this patent is extended or adjusted under 35 U.S.C. 154(b) by 111 days.

(21) Appl. No.: 17/199,279

(22) Filed: Mar. 11, 2021

(65) Prior Publication Data
US 2021/0286902 A1 Sep. 16, 2021

(30) Foreign Application Priority Data

Mar. 16, 2020 (FR) ...................................... 2002563

(51) Int. Cl.
*G06F 21/72* (2013.01)
(52) U.S. Cl.
CPC .................................... *G06F 21/72* (2013.01)
(58) Field of Classification Search
CPC ...... G06F 11/00; H04L 9/004; H04L 2209/12; H04L 9/003
See application file for complete search history.

(56) References Cited

U.S. PATENT DOCUMENTS

| | | | | |
|---|---|---|---|---|
| 8,386,804 B2* | 2/2013 | Yoshiya | ................... | G06F 21/72 713/193 |
| 10,223,014 B1* | 3/2019 | Atsatt | ................... | G06F 3/0629 |
| 10,726,607 B1* | 7/2020 | Guirado | ................. | G06F 9/3877 |
| 10,877,839 B2* | 12/2020 | Gaikwad | ............. | H03M 13/356 |
| 2004/0015743 A1* | 1/2004 | Si | .......................... | H03M 13/05 |
| 2009/0300371 A1* | 12/2009 | Yoshiya | ......... | G01R 31/318533 714/E11.002 |
| 2011/0170691 A1* | 7/2011 | Liardet | ................... | H04L 9/004 380/259 |
| 2020/0313850 A1* | 10/2020 | Lin | ...................... | G06F 16/9017 |

FOREIGN PATENT DOCUMENTS

| | | | |
|---|---|---|---|
| EP | 2 320 596 A1 | 5/2011 | |
| GB | 2468419 A * | 9/2010 | ............. H04L 9/004 |
| GB | 2468419 A | 9/2010 | |

OTHER PUBLICATIONS

Tillich et al., "Protecting AES Software Implementations on 32-Bit Processors Against Power Analysis," Applied Cryptography and Network Security, Zhuhai, China, Jun. 5-8, 2007, pp. 141-157.

* cited by examiner

*Primary Examiner* — Lizbeth Torres-Diaz
(74) *Attorney, Agent, or Firm* — Seed Intellectual Property Law Group LLP (57) ABSTRACT

The present disclosure relates to a method of fault detection in an application, by an electronic circuit, of a first function to a message, including the steps of generating, from the message, a non-zero even number N of different first sets, each including P shares; applying, to the P shares of each first set, one or a plurality of second functions delivering, for each first set, a second set including Q images; and cumulating all the images, starting with at most Q-1 images selected from among the Q images of a same second set.

28 Claims, 3 Drawing Sheets

FAULT DETECTION

BACKGROUND

Technical Background

The present disclosure generally relates to electronic circuits and, more specifically, to circuits executing encryption algorithms.

Description of the Related Art

In many applications, electronic circuits implement cipher, authentication, signature calculation algorithms, and more generally algorithms manipulating data, called secret data, that is, the access to which is desired to be reserved to certain users or circuits. There in particular exist symmetric encryption algorithms or secret key algorithms, for example, AES- or SM4-type algorithms, which enable to cipher and to decipher messages by means of a key.

There exist many methods, called attacks, to attempt discovering or hacking secret data manipulated by such algorithms. Among such attacks, so-called side channel attacks (SCA) use information such as the power consumption of the circuit (SPA, DPA attacks), the electromagnetic radiation thereof, etc. The interpretation of such information is capable of providing the hacker with information relative to the secret data. So-called fault attacks are also known, which comprise deliberately causing an unusual operation of the circuit to deduce therefrom information relative to the secret data.

BRIEF SUMMARY

An embodiment facilitates overcoming all or part of the disadvantages of known methods and circuits of protection of encryption algorithms against attacks.

An embodiment provides a method of fault detection in an application, by an electronic circuit, of a first function to a message, comprising the steps of:

generating, from the message, a non-zero even number N of different first sets, each comprising P shares;

applying, to the P shares of each first set, one or a plurality of second functions providing, for each first set, a second set comprising Q images; and cumulating all the images, starting with at most Q-1 images selected from among the Q images of a same second set.

According to an embodiment, each first set of shares is generated by a masking, for example, random masking, of the message.

According to an embodiment, the masking of the message is performed by an XOR operator.

According to an embodiment, the accumulation of the images is performed by an XOR operator.

According to an embodiment, the first function is a linear transformation.

According to an embodiment, each image of a same second set is obtained by applying a same second function to each share of the corresponding first set.

According to an embodiment, the first function is a non-linear transformation.

According to an embodiment, each image of a same second set is obtained by applying a second function, among a plurality of different second functions, to at most P-1 shares of the corresponding first set.

According to an embodiment, the method comprises the step of verifying whether a result of the accumulation of the images of the N second sets is zero.

According to an embodiment, the second function(s) are applied in a random order to the shares of each first set.

An embodiment provides an electronic circuit, configured to implement the method such as described.

According to an embodiment, a memory area is intended to store intermediate values originating from the accumulation of the images.

In an embodiment, a method comprises: applying, using a cryptographic circuit, an encryption function to a message; and protecting the cryptographic circuit during the application of the encryption function to the message, the applying the encryption function and the protecting including: generating, using the message, a non-zero even number of different sets of shares, each set of shares comprising a number P of shares, where P is an integer greater than or equal to 2; applying one or more functions to each share of each set of shares, generating a plurality of sets of images, each set of images comprising a number Q of images, where Q is an integer greater than or equal to 2; and accumulating the images of the sets of images, starting with at most Q-1 images selected from among the images of one of the sets of images. In an embodiment, the generating the sets of shares comprises applying masks to the message. In an embodiment, the method comprises randomly selecting masks to apply to the message. In an embodiment, the applying a mask comprises performing an XOR operation. In an embodiment, the accumulation comprises applying XOR operations. In an embodiment, the encryption function is a linear transformation. In an embodiment, each image of one of the sets of images is obtained by applying a same function to each share of a corresponding set of shares. In an embodiment, the encryption function is a non-linear transformation. In an embodiment, each image of one of the sets of images is obtained by applying a function, among a plurality of different functions, to at most P minus one shares of a corresponding set of shares. In an embodiment, the method comprises verifying whether a result of the accumulation of the images of the sets of images is zero. In an embodiment, the function(s) are applied in a random order to shares of a set of shares.

In an embodiment, a device comprises: a memory; and cryptographic circuitry coupled to the memory, wherein the cryptographic circuitry, in operation, applies an encryption function to a message, the applying the cryptographic function to the message including: generating, using the message, a non-zero even number of different sets of shares, each set of shares comprising a number P of shares, where P is an integer greater than or equal to 2; applying one or more functions to each share of each set of shares, generating a plurality of sets of images, each set of images comprising a number Q of images, where Q is an integer greater than or equal to 2; and accumulating the images of the sets of images, starting with at most Q-1 images selected from among the images of one of the sets of images. In an embodiment, the encryption circuitry, in operation, generates the sets of shares by applying masks to the message. In an embodiment, the encryption circuitry, in operation, applies XOR operations to accumulate the images. In an embodiment, the encryption function is a linear transformation. In an embodiment, the encryption circuitry, in operation, generates images of one of the sets of images by applying a same function to each share of a corresponding set of shares. In an embodiment, the encryption function is a non-linear transformation. In an embodiment, the encryption circuitry, in operation, generates images of one of the sets of images by applying a function, among a plurality of different functions, to at most P-1 shares of a corresponding set of shares. In an embodiment, the cryptographic circuitry, in operation, verifies whether a result of the accumulation of the images of the sets of images is zero. In an embodiment, the cryptographic circuitry, in operation, randomly applies functions of a set of functions to shares of a set of shares to generate images of a corresponding set of images. In an embodiment, the cryptographic circuitry, in operation, stores intermediate results of the accumulating in the memory.

In an embodiment, a system comprises: one or more interfaces; and one or more processing cores coupled to the one or more interfaces, wherein the one or more processing cores include cryptographic circuitry, which, in operation, generates, using a message, a non-zero even number of different sets of shares, each set of shares comprising a number P of shares, where P is an integer greater than or equal to 2; applies one or more functions to each share of each set of shares, generating a plurality of sets of images, each set of images comprising a number Q of images, where Q is an integer greater than or equal to 2; and accumulates the images of the sets of images, starting with at most Q-1 images selected from among the images of one of the sets of images. In an embodiment, the system comprises an integrated circuit including the cryptographic circuitry. In an embodiment, the cryptographic circuitry, in operation, applies a linear transformation to the message.

In an embodiment, a non-transitory computer-readable medium's contents configure cryptographic circuitry to perform a method, the method comprising: applying an encryption function to a message; and protecting the cryptographic circuitry during the application of the encryption function to the message, the applying the encryption function and the protecting including: generating, using the message, a non-zero even number of different sets of shares, each set of shares comprising a number P of shares, where P is an integer greater than or equal to 2; applying one or more functions to each share of each set of shares, generating a plurality of sets of images, each set of images comprising a number Q of images, where Q is an integer greater than or equal to 2; and accumulating the images of the sets of images, starting with at most Q-1 images selected from among the images of one of the sets of images. In an embodiment, the encryption function is a linear transformation. In an embodiment, each image of one of the sets of images is obtained by applying a same function to each share of a corresponding set of shares. In an embodiment, the contents comprise instructions executed by the cryptographic circuitry.

In an embodiment, a method for detecting faults in an application, by an electronic circuit, of a first function to a message comprises: generating, from the message, a non-zero even number N of different first sets each comprising P data elements; applying, in a random order, to the P data elements of each first set, one or more second functions, providing, for each first set, a second set comprising Q images; and cumulating all the images, starting with at most Q-1 images chosen from among the Q images of the same second set.

BRIEF DESCRIPTION OF THE SEVERAL VIEWS OF THE DRAWINGS

The foregoing and other features and advantages of the present disclosure will be discussed in detail in the following non-limiting description of specific embodiments and implementation modes in connection with the accompanying drawings, in which.

DETAILED DESCRIPTION

Like features have been designated by like references in the various figures, unless the context indicates otherwise. In particular, the structural and/or functional elements common to the different embodiments and implementation modes may be designated with the same reference numerals and may have identical structural, dimensional, and material properties.

For clarity, only those steps and elements which are useful to the understanding of the described embodiments and implementation modes have been shown and will be detailed. In particular, the encryption algorithms have not been detailed, the described embodiments and implementation modes being compatible with usual encryption algorithms.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following description, when reference is made to terms qualifying absolute positions, such as terms "front", "back", "top", "bottom", "left", "right", etc., or relative positions, such as terms "above", "under", "upper", "lower", etc., or to terms qualifying directions, such as terms "horizontal", "vertical", etc., unless otherwise specified, it is referred to the orientation of the drawings.

Unless specified otherwise, the expressions "around", "approximately", "substantially" and "in the order of" signify within 10%, within 5%, etc.

Figure 1:
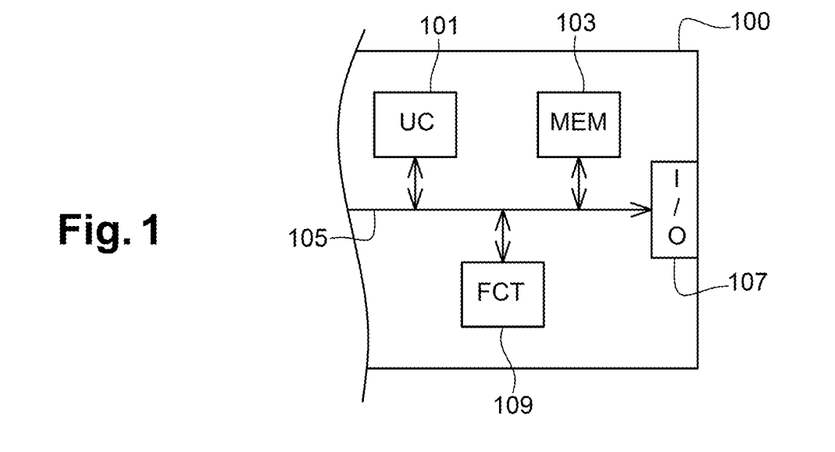
FIG. 1 schematically and partially shows an example of an electronic circuit of the type to which the described implementation modes apply as an example.

FIG. 1 schematically and partially shows an example of an electronic circuit 100 of the type to which the described embodiments may apply as an example.

In the shown example, circuit 100 comprises:

calculation circuitry 101 (UC), for example, a state machine, a microprocessor, a programmable logic circuit, etc.;

at least one volatile or non-volatile storage area 103 (MEM) or memory area, for example enabling to store all or part of data and/or of keys;

one or a plurality of data, address, and/or control buses 105 between the different elements internal to circuit 100; and one or a plurality of input-output interfaces 107 (I/O) for communicating with the outside of circuit 100.

As an example, circuit 100 comprises various other circuits specific to the application. These circuits are, in FIG. 1, symbolized by a block 109 (FCT).

In the rest of the disclosure, it is arbitrarily considered that circuit 100 is configured to implement all or part of an encryption algorithm, for example, a symmetrical cipher algorithm of AES or SM4 type. For simplification, it is for example considered that circuit 100 is particularly configured to apply a first encryption function (not shown) to a message, called M. As an example, message M corresponds to all or part of secret data manipulated by circuit 100 during the execution of the cipher algorithm.

Figure 2:
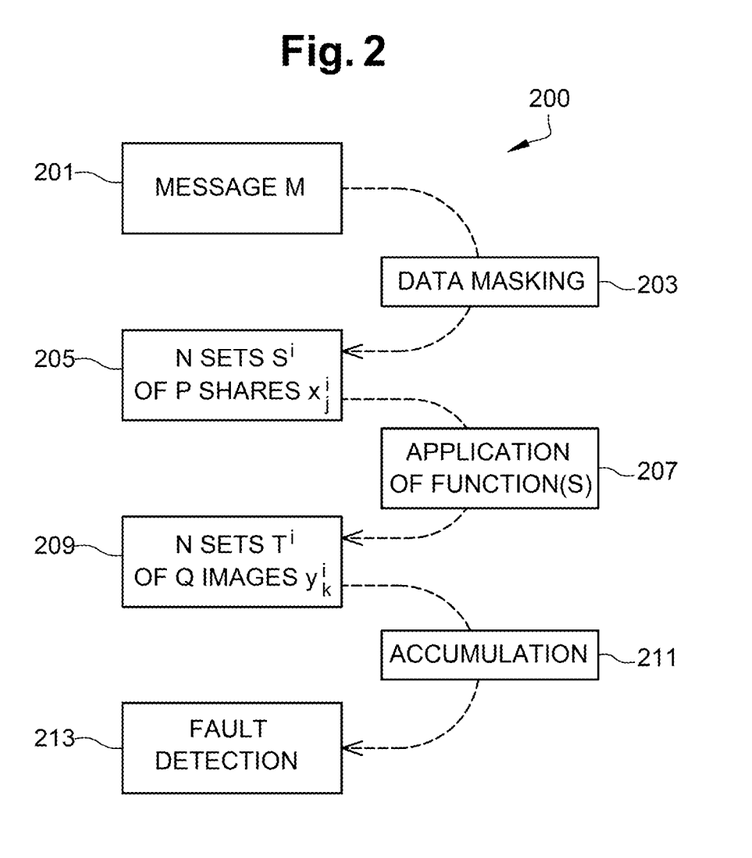
FIG. 2 schematically shows in the form of blocks an embodiment of a fault detection method.

FIG. 2 very schematically shows in the form of blocks an implementation mode of a fault detection method 200. The method 200 described in relation with FIG. 2 for example facilitates detecting a possible fault attack during the application of the first encryption function to message M.

As an example, the method 200 of FIG. 2 is implemented in the context of a so-called "threshold implementation" of the cipher algorithm.

In the shown example, message M (block 201, MESSAGE M) is masked (block 203, DATA MASKING). Masking 203 more particularly enables to generate (block 205, N SETS $S^i$ OF P SHARES $x^i_j$), from a same message M, a number N of first sets $S^i$ of shares $x^i_j$. As an example, the N sets $S^i$ each comprise a same number P, which is an integer greater than or equal to two, of shares $x^i_j$.

In the present description, $S^i$ ($1 \leq i \leq N$) designates the $i^{th}$ set of shares $x^i_j$ ($1 \leq j \leq P$) designates the $j^{th}$ share of the $i^{th}$ set $S^i$. In the present description, exponent i is not used to designate a raising to power i.

According to an implementation mode, shares $x^i_j$ are selected or generated so that a combination, for example, by an XOR operator, of the P shares $x^i_j$ of each set $S^i$ corresponds to message M. In other words, it is ascertained that the P shares $x^i_1$ to $x^i_P$ of each set $S^i$ verify the following relation:

[Math 1]

$$M = x^i_1 \oplus x^i_2 \oplus \ldots \oplus x^i_P$$

In practice, in the present disclosure, the XOR operator may correspond to a hardware operator or to the application of an XOR software function.

According to an implementation mode, the masking 203 of message M is a random masking. As an example, the shares $x^i_j$ of each set $S^i$ are generated from at least one combination, by an XOR operator, of message M with one or a plurality of random numbers.

The N sets $S^i$ of shares $x^i_j$ are, for example, different from one another. In other words, it is ascertained that the generation, from message M, of the N sets $S^1$ to $S^N$ does not result in the obtaining of a set $S^i$ which would have all its P shares $x^i_j$, taken in the order or not, identical to the P shares $x^i_j$ of one of the other sets $S^i$.

One or a plurality of second functions are then applied (block 207, APPLICATION OF FUNCTION(S)) to the shares $x^i_j$ of each set $S^i$. This provides (block 209, N SETS $T^i$ OF Q IMAGES $y^i_k$) N second sets $T^i$ of images $y^i_k$ of shares $x^i_j$ by the second functions. As an example, the N sets $T^i$ each comprise a same number Q, which is an integer greater than or equal to two, of images $y^i_k$. In the rest of the description, it is arbitrarily considered that the number Q of images $y^i_k$ in each set $T^i$ is equal to the number P of shares $x^i_j$ in each set $S^i$. However, different numbers P and Q may be provided as a variation.

In the present disclosure, $T^i$ ($1 \leq i \leq N$) designates the $i^{th}$ set of images, originating from the application of the second functions to the $i^{th}$ set $S^i$ of shares $x^i_j$, and $y^i_k$ ($1 \leq k \leq Q$) designates the $k^{th}$ image of the $i^{th}$ set $T^i$.

As an example, the second functions are, in practice, sub-functions of the first function. The second functions are for example selected so that their applications to the P shares $x^i_j$ of each set $S^i$ provides a result R equivalent to that which would be obtained by directly applying the first function to message M. The application of the second functions to the shares $x^i_j$ originating from the masking 203 of message M however has the advantage, particularly over an implementation which would comprise directly applying the first function to message M, of providing a better protection of the cipher algorithm against side channel attacks (SCA).

As an example, the application of the first function to message M provides a result R equal to that of a combination, by an XOR operator, of the Q images $y^i_k$ of a same set $T^i$. In other words, the Q images $y^i_k$ of each second set $T^i$ verify the following relation:

[Math 2]

$$R = y^i_1 \oplus y^i_2 \oplus \ldots \oplus y^i_Q$$

In the shown example, all the Q images $y^i_k$ of all the N sets $T^i$ are cumulated (bloc 211, ACCUMULATION). The accumulation 211 of all the N.Q images $y^i_k$ is for example performed by an XOR operator. As an example, the accumulation 211 of all images $y^i_k$ enables to verify (block 213, FAULT DETECTION) whether the application 207 of the second function(s) has or not undergone a fault attack.

According to an implementation mode, accumulation 211 is performed by starting with at most Q-1 images $y^i_k$ selected from among the Q images $y^i_1$ to $y^i_Q$ of one of sets $T^i$. As an example, accumulation 211 is performed by starting with images $y^1_1$ to $y^1_{Q-1}$ of set $T^1$, and by then carrying on with images $y^2_1$ to $y^2_Q$, $y^3_1$ to $y^3_Q$, ... $y^N_1$ to $y^N_Q$ of sets $T^2$ to $T^N$ and by ending with the $Q^{th}$ image $y^1_Q$ of set $T^1$.

In practice, accumulation 211 for example starts with a combination of two images $y^i_k$ by the XOR operator to provide a first intermediate result. As an example, the first intermediate result is stored in an accumulator or register, for example, in the memory area 103 of circuit 100 (FIG. 1). The first intermediate result is then combined, by the XOR operator, with another image $y^i_k$ to provide a second intermediate result. As an example, the second intermediate result is stored in the accumulator, for example, instead of the first intermediate result, before being in turn combined with still another image $y^i_k$, and so on, to obtain the final result of accumulation 211 of all the images $y^i_k$ by the XOR operator.

It could have been devised to accumulate all the images $y^i_k$, starting with the Q images $y^i_k$ of a same set $T^i$. For example, it could have been started by cumulating the Q images to $y^1_1$ of set and then the Q images $y^2_1$ to $y^2_Q$ of set $T^2$, and so on, all the way to the Q images $y^N_1$ to $y^N_Q$ of set $T^N$. This would however have the disadvantage of storing in the accumulator, particularly at the end of the accumulation of the Q images to $y^1_Q$ of set $T^1$, an intermediate result equal to the result R of the application of the first function to message M. This might provide an attacker with information enabling him/her to discover the message M which is desired to be kept secret.

According to an embodiment, the number N of sets $S^i$ originating from the masking 203 of message M is a non-zero even integer. In this case, verification 213 for example comprises making sure that a result of the accumulation 211 of the images $y^i_k$ of the N second sets $T^i$ is zero.

Figure 3:
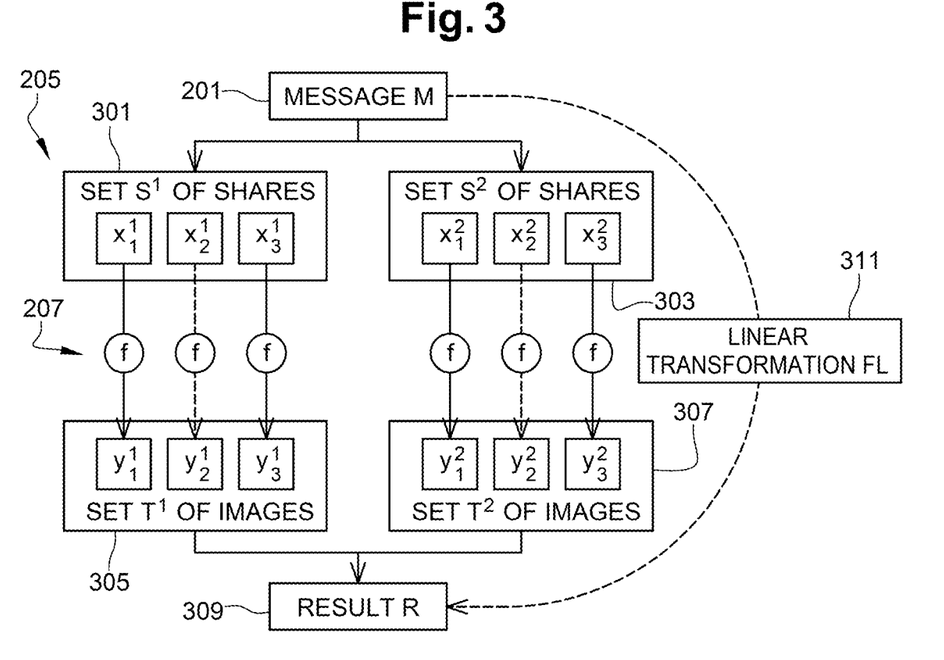
FIG. 3 schematically shows in the form of blocks an example of application of the method of FIG. 2 to a linear transformation.

FIG. 3 schematically shows in the form of blocks an example of application of the method 200 of FIG. 2 to a linear transformation, noted FL.

In the shown example, it is arbitrarily considered that two sets 5' (block 301, SET $S^1$ OF SHARES) and $S^2$ (block 303, SET $S^2$ OF SHARES) of shares $x^i_j$ are generated from message M (block 201, MESSAGE M). As an example, it is considered as a simplification that each set $S^1$, $S^2$ comprises three shares $x^i_1$ to $x^i_3$. More particularly, in the shown example, set $S^1$ comprises three shares $x^1_1$, $x^1_2$, and $x^1_3$ and set $S^2$ comprises three shares $x^2_1$, $x^2_2$, and $x^2_3$ (N=2 and P=3 in this case).

The shares of each set $S^1$, $S^2$ are for example obtained by random masking of message M. As an example, message M is first combined by the XOR operator with a first random number, noted R1, to obtain share $x^1_1$:

[Math 3]

$$x_1^1 = M \oplus R1$$

One may for example combine, with the XOR operator, the first random number R1 with a second random number, noted R2, to obtain share $x^1_2$:

[Math 4]

$$x_2^1 = R1 \oplus R2$$

According to relations [Math 3] and [Math 4], message M verifies the following relation:

[Math 5]

$$M = x_1^1 \oplus R1 = x_1^1 \oplus (x_2^1 \oplus R2) = x_1^1 \oplus x_2^1 \oplus R2$$

Considering that the second random number R2 corresponds to share $x^1_3$, that is, replacing R2 with $x^1_3$ in the above relation [Math 5], shares $x^1_1$, $x^1_2$, and $x^1_3$ form an example of random masking of message M.

Generally, the masking of message M is, for example, performed so that the knowing of P-1 shares $x^i_j$ of a same set $S^i$ provides no information relative to message M. In other words, it is ascertained that only the knowing of the P shares $x^i_j$ of a same set $S^i$ enables to restore message M.

As an example, the shares $x^2_1$, $x^2_2$, and $x^2_3$ of set $S^2$ are obtained by proceeding similarly to what has been described hereabove for the shares $x^1_1$, $x^1_2$, and $x^1_3$ of set $S^1$. Shares $x^2_1$, $x^2_2$, and $x^2_3$ are for example generated by the combination of message M with two other random numbers, different from the first and second random numbers R1 and R2. It is thus that sets $S^1$ and $S^2$ are different, in other words, that the shares $x^1_1$, $x^1_2$, and $x^1_3$ of set $S^1$ cannot all be found among the shares $x^2_1$, $x^2_2$, and $x^2_3$ of set $S^2$.

In the shown example, a same second function, noted f, is applied 207 to each share $S^1$, $S^2$ to form sets $T^1$ (block 305, SET $T^1$ OF IMAGES) and $T^2$ (block 307, SET $T^2$ OF IMAGES) of images $y^i_k$. In other words, the image $y^i_k$ of each share $x^i_j$ is calculated with function f. More particularly, in the shown example, the following is calculated:

the images $y^1_1$, $y^1_2$ and $y^1_3$ respectively obtained by application of function f to each of the shares $x^1_1$, $x^1_2$, and $x^1_3$ of set $S^1$; and the images $y^2_1$, $y^2_2$, and $y^2_3$ respectively obtained by application of function f to each of the shares $x^2_1$, $x^2_2$, and $x^2_3$ of set $S^2$.

In the shown example, the application of function f to the shares $x^i_j$ of a set $S^i$ enables to obtain, from the images $y^i_k$ of a set $T^i$, result R (block 309, RESULT R). Result R is identical to the result which would be obtained by directly applying (block 311, LINEAR TRANSFORMATION FL) linear transformation FL to message M. Transformation FL being supposed to be linear, it verifies the following relation:

[Math 6]

$$R = FL(M) = FL(x_1^1 \oplus x_2^1 \oplus x_3^1) = FL(x_1^1) \oplus FL(x_2^1) \oplus FL(x_3^1)$$

Considering that function f is equivalent to linear transformation FL, relation [Math 6] can be rewritten as follows:

[Math 7]

$$R = FL(M) = f(x_1^1) \oplus f(x_2^1) \oplus f(x_3^1) = y_1^1 \oplus y_2^1 \oplus y_3^1$$

The above relations [Math 6] and [Math 7] can be transposed to the shares $x^2_1$, $x^2_2$, and $x^2_3$ of set $S^2$ and to the images $y^2_1$, $y^2_2$, and $y^2_3$ of set $T^2$. In particular:

[Math 8]

$$R = FL(M) = f(x_1^2) \oplus f(x_2^2) \oplus f(x_3^2) = y_1^2 \oplus y_2^2 \oplus y_3^2$$

According to an embodiment, the second functions f are applied in a random order to the shares $x^i_j$ of each set $S^1$, $S^2$. This particularly enables to reinforce the protection of the calculation of result R against possible side channel attacks. It is in particular less likely for an attacker to succeed in isolating all the images $y^i_k$ of a same set $T_i$ and in thus restoring result R. This probability is all the lower as numbers N and Q are large.

Figure 4:
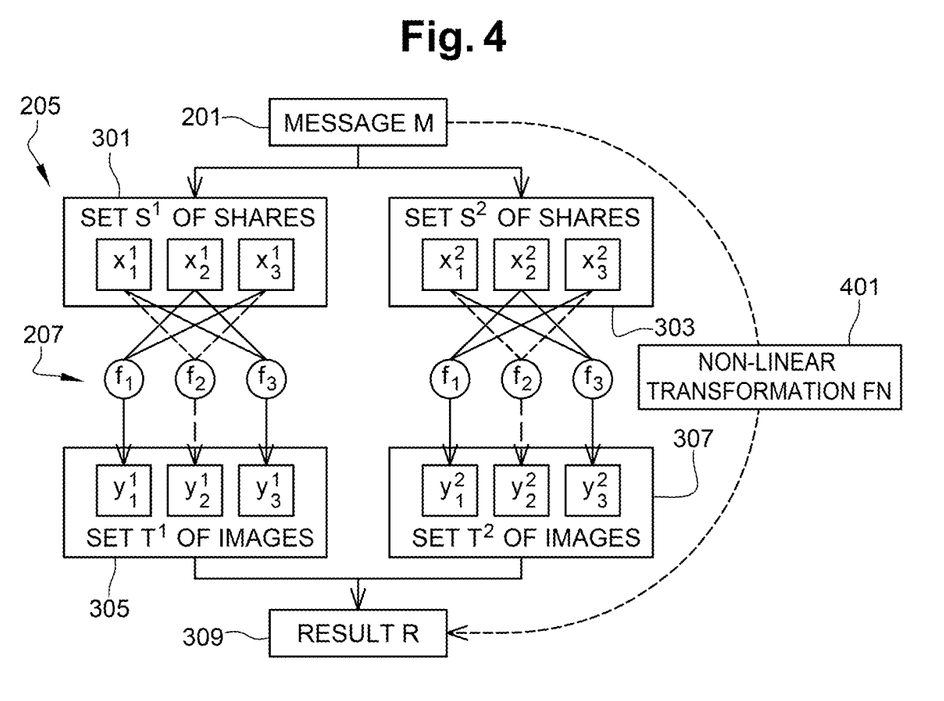
FIG. 4 schematically shows in the form of blocks another example of application of the method of FIG. 2 to a non-linear transformation.

FIG. 4 schematically shows in the form of blocks another example of application of the method 200 of FIG. 2 to a non-linear transformation, called FN.

The example of application of FIG. 4 has elements common with the example of application of FIG. 3. The common elements will not be described again hereafter. In particular, in the example of application of FIG. 4, sets $S^1$ (block 301, SET $S^1$ OF SHARES) and $S^2$ (block 303, SET $S^2$ OF SHARES) of shares $x^i_j$ may be generated from message M (block 201, MESSAGE M) similarly to what has been previously discussed in relation with the example of application of FIG. 3.

In the shown example, each image $y^i_k$ of a same set $T^i$ is obtained by applying a second function, among a plurality of different second functions $f_1$, $f_2$ and $f_3$, to at most P-1 shares $x^i_j$ of the corresponding set $S^i$. The sets $T^1$ (block 305, SET $T^1$ OF IMAGES) and $T^2$ (block 307, SET $T^2$ OF IMAGES) of images $y^i_k$ are thus formed. More particularly, in the shown example:

image $y^1_1$ is obtained by application of function $f_1$ to shares $x^1_2$ and $x^1_3$ of set $S^1$;

image $y^1_2$ is obtained by application of function $f_2$ to shares $x^1_1$ and $x^1_3$ of set $S^1$;

image $y^1_3$ is obtained by application of function $f_3$ to shares $x^1_1$ and $x^1_2$ of set $S^1$;

image $y^2_1$ is obtained by application of function $f_1$ to shares $x^2_2$ and $x^2_3$ of set $S^2$;

image $y^2_2$ is obtained application of function $f_2$ to shares $x^2_1$ and $x^2_3$ of set $S^2$; and image $y^2_3$ is obtained by application of function $f_3$ to shares $x^2_1$ and $x^2_2$ of set $S^2$.

In the shown example, the application of functions $f_1$, $f_2$, and $f_3$ to the shares $x^i_j$ of a set $S^i$ enables to obtain, from the images $y^i_k$ of a set $T^i$, result R (block 309, RESULT R) identical to that which would be obtained by directly applying (block 401, NON-LINEAR TRANSFORMATION FN) non-linear transformation FN to message M.

In the shown example, transformation FN and functions $f_1$, $f_2$, and $f_3$ particularly verify the following relation:

[Math 9]

$$R=FN(M)=f_1(x_2^1,x_3^1) \oplus f_2(x_1^1,x_3^1) \oplus f_3(x_1^1,x_2^1)=y_1^1 \oplus y_2^1 \oplus y_3^1$$

Transformation FN and functions $f^1$, $f^2$, and $f^3$ further verify the following relation:

[Math 10]

$$R=FN(M)=f_1(x_2^2,x_3^2) \oplus f_2(x_1^2,x_3^2) \oplus f_3(x_1^2,x_2^2)=y_1^2 \oplus y_2^2 \oplus y_3^2$$

According to an embodiment, the second functions $f^1$, $f^2$, and $f^3$ are applied in a random order to the shares $x_j^i$ of each set $S^1$, $S^2$. This particularly enables to reinforce the protection of the calculation of result R against possible side channel attacks and to obtain advantages similar to those of the example of application discussed in relation with FIG. 3.

Figure 5:
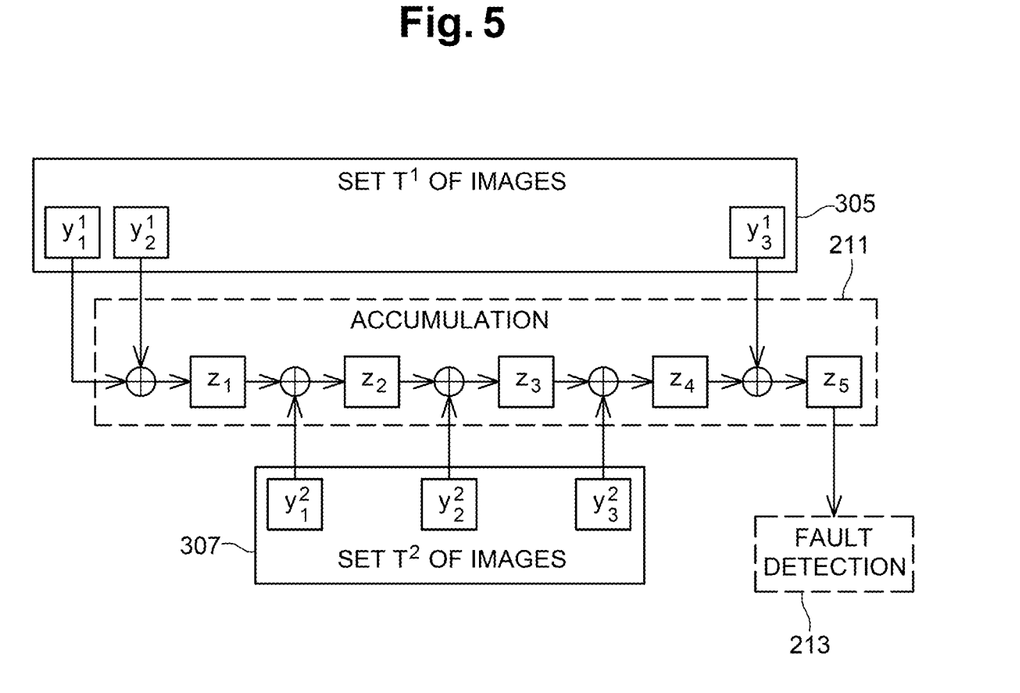
FIG. 5 schematically shows in the form of blocks example steps associated with the implementation mode of the method of FIG. 2.

FIG. 5 schematically shows, in the form of blocks, steps associated with the embodiment of the method 200 of FIG. 2.

In the shown example, the images $y_k^i$ of sets $T^1$ (block 305, SET $T^1$ OF IMAGES) and $T^2$ (bloc 307, SET $T^2$ OF IMAGES) are cumulated (block 211, ACCUMULATION). In FIG. 5, sets $T^1$ and $T^2$ may be indifferently obtained from the example of application of FIG. 3 or from the example of application of FIG. 4.

In the shown example, it is started by combining, with an XOR operator, the images $y_1^1$ and $y_2^1$ of set $T^1$ to obtain an intermediate result, noted $z_1$. Intermediate result $z_1$ is then combined, by an XOR operator, with the image $y_1^2$ of set $T^2$ to obtain another intermediate result, noted $z_2$. Intermediate result $z_2$ is then combined, by an XOR operator, with the image $y^2$ of set $T^2$ to obtain still another intermediate result, noted $z_3$. Then, intermediate result $z_3$ is combined, by an XOR operator, with the image $y_3^2$ of set $T^2$ to obtain still another intermediate result, noted $z_4$. Then, intermediate result $z_4$ is combined, by an XOR operator, with the image $y_3^1$ of set $T^1$ to obtain still another intermediate result, noted $z_5$. In the shown example, intermediate result $z_5$ corresponds to the final result of the accumulation 211 of images $y_1^1$, $y_2^1$ and $y_3^1$ of set $T^1$ and of images $y_1^2$, $y_2^2$ and $y_3^2$ of set $T^2$.

In the shown example, results $z_1$ to $z_5$ verify the following relation:

[Math 11]

$$z_5=z_4 \oplus y_3^1=z_3 \oplus y_3^2 \oplus y_3^1=z_2 \oplus y_2^2 \oplus y_3^2 \oplus y_3^1=z_1 \oplus y_1^2 \oplus y_2^2 \oplus y_3^2 \oplus y_3^1$$

In practice, intermediate results $z_1$ to $z_5$ are for example successively stored in the memory area 103 of circuit 100 (FIG. 1). As an example, memory area 103 is configured to store a single intermediate result at a time, a content of memory are 103 being for example updated at the end of the calculation of each new intermediate result. According to an implementation mode, it is verified (block 213, FAULT DETECTION) whether the result $z_5$ of the accumulation of the images $y_k^i$ of the two second sets $T^1$ and $T^2$ is zero. In the shown example, if the application of transformation FL or FN to message M, that is, the application of function for of functions $f^1$, $f^2$, and $f^3$ to the shares $x_j^i$ of sets $S^1$ and $S^2$, has not undergone a fault attack, result $z_5$ is equal to zero according to the following relation:

[Math 12]

$$z_5=y_1^1 \oplus y_2^1 \oplus y_2^2 \oplus y_3^2 \oplus y_3^1 = R \oplus R = 0$$

An advantage of the implementation mode discussed hereabove in relation with FIGS. 2 to 5 is the fact that the accumulation 211 of the images $y_1^1$, $y_2^1$, and $y_3^1$ of set $T^1$ and of images $y_1^2$, $y_2^2$ and $y_3^2$ of set $T^2$ enables to store the value of result R into the memory 103 of circuit 100 (FIG. 1). It is thus for example avoided to give the possibility to a possible attacker to obtain result R by observing the content of memory 103.

Various embodiments, implementation modes, and variations have been described. Those skilled in the art will understand that certain features of these various embodiments, implementation modes, and variants, may be combined and other variants will occur to those skilled in the art.

Finally, the practical implementation of the described embodiments, implementation modes, and variants is within the abilities of those skilled in the art based on the functional indications given hereabove. In particular, although examples of application where two sets $S^1$ and $S^2$, each comprising three shares, are generated from message M have been described in relation with FIGS. 3 and 4, it may in practice be provided to generate a number N greater than two of sets $S^i$, for example, ten sets $S^i$, each comprising a number P of shares $x_j^i$ greater than three, for example five shares $x_j^i$. Generally, it will be within the abilities of those skilled in the art to adapt numbers N and P according to a protection level to be reached.

It will further be within the abilities of those skilled in the art to select the second function f and the second functions $f_1$, $f_2$, and $f_3$ so that, when shares $x_j^i$ follow a uniform distribution, images $y_k^i$ also follow a uniform distribution.

Such alterations, modifications, and improvements are intended to be part of this disclosure, and are intended to be within the spirit and the scope of the present disclosure. Accordingly, the foregoing description is by way of example only and is not intended to be limiting. The present disclosure is limited only as defined in the following claims and the equivalents thereto.

Some embodiments may take the form of or comprise computer program products. For example, according to one embodiment there is provided a computer readable medium comprising a computer program adapted to perform one or more of the methods or functions described above. The medium may be a physical storage medium, such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
applying, using a cryptographic circuit, an encryption function to a message; and
protecting the cryptographic circuit during the application of the encryption function to the message, the applying the encryption function and the protecting including:
generating, using the message, a non-zero even number of different sets of shares, each set of shares comprising a number P of shares, where P is an integer greater than or equal to 2 and each set of shares represents the message;
applying one or more second functions to each share of each set of shares, generating a plurality of sets of images, each set of images comprising a number Q of images, where Q is an integer greater than or equal to 2 and each set of images represents a result of applying the encryption function to the message;
accumulating the images of all of the sets of images, starting with at most Q-1 images selected from among the images of one of the sets of images, and continuing with the accumulating with images from other sets of the plurality of sets of images before accumulating remaining images of the one of the sets of images, wherein the accumulating comprises combining the images using XOR operations; and
detecting an attack on the cryptographic circuit based on whether a result of the accumulating of the sets of images is zero.

2. The method according to claim 1, wherein the generating the sets of shares comprises applying masks to the message.

3. The method of claim 2, comprising randomly selecting masks to apply to the message.

4. The method according to claim 2, wherein the applying a mask comprises performing an XOR operation.

5. The method according to claim 1, wherein the encryption function is a linear transformation.

6. The method according to claim 5, wherein each image of one of the sets of images is obtained by applying a same function to each share of a corresponding set of shares.

7. The method according to claim 1, wherein the encryption function is a non-linear transformation.

8. The method according to claim 7, wherein each image of one of the sets of images is obtained by applying a function, among a plurality of different functions, to at most P minus one shares of a corresponding set of shares.

9. The method according to claim 1, wherein an attack is detected in response to a result of the accumulation of the images of the sets of images is not being equal to zero.

10. The method according to claim 1, wherein the function(s) are applied in a random order to shares of a set of shares.

11. The method of claim 1, wherein the accumulation starts with at least two images selected from among the images of the one of the sets of images.

12. A device, comprising:
a memory; and
a cryptographic circuitry coupled to the memory, wherein the cryptographic circuitry, in operation, applies an encryption function to a message and protects the cryptographic circuitry during the application of the encryption function to the message, the applying the cryptographic function to the message and the protecting including:
generating, using the message, a non-zero even number of different sets of shares, each set of shares comprising a number P of shares, where P is an integer greater than or equal to 2 and each set of shares represents the message;
applying one or more second functions to each share of each set of shares, generating a plurality of sets of images, each set of images comprising a number Q of images, where Q is an integer greater than or equal to 2 and each set of images represents a result of applying the encryption function to the message;
accumulating the images of all of the sets of images, starting with at most Q-1 images selected from among the images of one of the sets of images, and continuing with the accumulating with images from other sets of the plurality of sets of images before accumulating remaining images of the one of the sets of images, wherein the accumulating comprises combining the images using XOR operations; and
detecting an attack on the cryptographic circuitry based on whether a result of the accumulating of the sets of images is zero.

13. The device of claim 12, wherein the encryption circuitry, in operation, generates the sets of shares by applying masks to the message.

14. The device of claim 12, wherein the encryption function is a linear transformation.

15. The device of claim 14, wherein the encryption circuitry, in operation, generates images of one of the sets of images by applying a same function to each share of a corresponding set of shares.

16. The device of claim 12, wherein the encryption function is a non-linear transformation.

17. The device of claim 16, wherein the encryption circuitry, in operation, generates images of one of the sets of images by applying a function, among a plurality of different functions, to at most P-1 shares of a corresponding set of shares.

18. The device of claim 12, wherein the cryptographic circuitry,
in operation, detects an attack in response to a result of the accumulation of the images of the sets of images not being equal to zero.

19. The device of claim 12, wherein the cryptographic circuitry, in operation, randomly applies functions of a set of functions to shares of a set of shares to generate images of a corresponding set of images.

20. The device of claim 12, wherein the cryptographic circuitry, in operation, stores intermediate results of the accumulating in the memory.

21. The device of claim 12, wherein the accumulation starts with at least two images selected from among the images of the one of the sets of images.

22. A system, comprising:
one or more interfaces; and
one or more processing cores coupled to the one or more interfaces, wherein the one or more processing cores include cryptographic circuitry, which, in operation, applies an encryption function to a message; and protects the cryptographic circuitry during the application of the encryption function to the message, the applying the encryption function and the protecting including:

generating, using the message, a non-zero even number of different sets of shares, each set of shares comprising a number P of shares, where P is an integer greater than or equal to 2 and each set of shares represents the message;

applying one or more second functions to each share of each set of shares, generating a plurality of sets of images, each set of images comprising a number Q of images, where Q is an integer greater than or equal to 2 and each set of images represents a result of applying the encryption function to the message;

accumulating the images of all of the sets of images, starting with at most Q-1 images selected from among the images of one of the sets of images, and continuing with the accumulating with images from other sets of the plurality of sets of images before accumulating remaining images of the one of the sets of images, wherein the accumulating comprises combining the images using XOR operations; and detecting an attack on the cryptographic circuitry based on whether a result of the accumulating of the sets of images is zero.

23. The system of claim 22, comprising an integrated circuit including the cryptographic circuitry.

24. The system of claim 22, wherein the cryptographic circuitry, in operation, applies a linear transformation to the message.

25. A non-transitory computer-readable medium having contents which configure cryptographic circuitry to perform a method, the method comprising:

applying an encryption function to a message; and protecting the cryptographic circuitry during the application of the encryption function to the message, the applying the encryption function and the protecting including:

generating, using the message, a non-zero even number of different sets of shares, each set of shares comprising a number P of shares, where P is an integer greater than or equal to 2 and each set of shares represents the message;

applying one or more second functions to each share of each set of shares, generating a plurality of sets of images, each set of images comprising a number Q of images, where Q is an integer greater than or equal to 2 and each set of images represents a result of applying the encryption function to the message;

accumulating the images of all of the sets of images, starting with at most Q-1 images selected from among the images of one of the sets of images, and continuing with the accumulating with images from other sets of the plurality of sets of images before accumulating remaining images of the one of the sets of images, wherein the accumulating comprises combining the images using XOR operations; and detecting an attack on the cryptographic circuitry based on whether a result of the accumulating of the sets of images is zero.

26. The non-transitory computer-readable medium of claim 25, wherein the encryption function is a linear transformation.

27. The non-transitory computer-readable medium of claim 26, wherein each image of one of the sets of images is obtained by applying a same function to each share of a corresponding set of shares.

28. The non-transitory computer-readable medium of claim 25, wherein the contents comprise instructions executed by the cryptographic circuitry.

* * * * *

UNITED STATES PATENT AND TRADEMARK OFFICE
CERTIFICATE OF CORRECTION

PATENT NO. : 11,625,504 B2
APPLICATION NO. : 17/199279
DATED : April 11, 2023
INVENTOR(S) : Yanis Linge et al.

Page 1 of 1

It is certified that error appears in the above-identified patent and that said Letters Patent is hereby corrected as shown below:

In the Claims

Column 11, Claim 9, Line 61:
"images is not being" should be: -- images not being --.

Signed and Sealed this
Twenty-third Day of May, 2023

Katherine Kelly Vidal
*Director of the United States Patent and Trademark Office*